United States Patent
Harkness

(10) Patent No.: US 9,976,263 B2
(45) Date of Patent: May 22, 2018

(54) MODULAR ROADWAY STRUCTURE AND RUNWAY CONSTRUCTED THEREFROM

(71) Applicant: The Boeing Company, Chicago, IL (US)

(72) Inventor: William Anthony Harkness, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 51 days.

(21) Appl. No.: 15/097,998

(22) Filed: Apr. 13, 2016

(65) Prior Publication Data

US 2017/0298577 A1 Oct. 19, 2017

(51) Int. Cl.
*E01C 9/00* (2006.01)
*B64F 1/36* (2017.01)
*E01C 5/00* (2006.01)

(52) U.S. Cl.
CPC .................. *E01C 9/00* (2013.01); *B64F 1/36* (2013.01); *E01C 5/00* (2013.01)

(58) Field of Classification Search
CPC .................. E01C 9/00; E01C 5/00; B64F 1/36
USPC .................... 404/34–36, 42, 73, 75
See application file for complete search history.

(56) References Cited

U.S. PATENT DOCUMENTS

| | | | | |
|---|---|---|---|---|
| 3,400,644 A | * | 9/1968 | Baskin | E01C 9/08 404/20 |
| 4,086,015 A | * | 4/1978 | Eliasson | E01F 8/025 404/6 |
| 4,605,337 A | * | 8/1986 | Springston | E01C 9/008 404/35 |
| 6,443,667 B2 | * | 9/2002 | Brown | E02L 33/14 404/19 |
| 6,779,476 B1 | * | 8/2004 | Sowell | B05D 5/02 114/261 |
| 2005/0072094 A1 | * | 4/2005 | Ardern | E01O 5/005 52/574 |
| 2007/0258765 A1 | * | 11/2007 | Coyle | E01C 5/20 404/19 |
| 2011/0299923 A1 | * | 12/2011 | Bleile | E01O 5/001 404/35 |
| 2016/0177516 A1 | * | 6/2016 | Penland, Jr. | E01C 9/086 404/35 |

FOREIGN PATENT DOCUMENTS

GB 2521643 * 12/2013 .............. E01C 9/08

OTHER PUBLICATIONS

Kapur, Akash, "India's 'Plastic Man' Turns Litter Into Paved Roads;" Bloomberg, Jul. 11, 2014; available at: http://www.bloomberg.com/news/articles/2014-07-10/indias-plastic-man-chemist-turns-litter-into-paved-roads; last visited Apr. 5, 2016.

* cited by examiner

*Primary Examiner* — Raymond W Addie
(74) *Attorney, Agent, or Firm* — Armstrong Teasdale LLP

(57) ABSTRACT

A modular roadway structure that includes a body portion including a bottom surface and a top surface. The bottom surface is configured to be positioned on a surface, and the top surface is formed with a predetermined textured pattern for defining a predetermined coefficient of friction across the top surface.

20 Claims, 3 Drawing Sheets

MODULAR ROADWAY STRUCTURE AND RUNWAY CONSTRUCTED THEREFROM

BACKGROUND

The field of the present disclosure relates generally to airport runway surfaces and, more specifically, to a runway formed from a plurality of modular roadway structures having a tailorable surface texture and capable of housing functional devices therein.

Many known airport runway surfaces, especially those located at large commercial airports, are fabricated from concrete or asphalt. For example, airport runway surfaces are generally fabricated from large amounts of poured concrete forming slabs having a thickness of up to about 20 inches. Forming the slabs from concrete enables the runway surface to withstand high exhaust temperatures from aircraft during takeoff and to withstand the weight of increasingly large aircraft, for example. While generally providing a desirable friction force for vehicles operating thereon, at least some known airport runway surfaces incorporate surface texturing or surface treatments of the concrete slabs to modify the surface properties of the runway surface. Incorporating such modifications to the runway surface can be a time-consuming and laborious task, and provides limited improvements to the surface properties of the runway surface during adverse weather conditions. Moreover, the solid construction of the concrete slabs makes it difficult for underlying technologies to be installed therein.

BRIEF DESCRIPTION

In one aspect, a modular roadway structure is provided. The modular roadway structure includes a body portion including a bottom surface and a top surface. The bottom surface is configured to be positioned on a surface, and the top surface is formed with a predetermined textured pattern for defining a predetermined coefficient of friction across the top surface.

In another aspect, a runway is provided. The runway includes a touch-down zone, a takeoff zone, and a runway zone extending between the touch-down zone and the takeoff zone. At least one of the touch-down zone, the takeoff zone, or the runway zone include a plurality of modular roadway structures that each include a top surface formed with a predetermined textured pattern for defining a predetermined coefficient of friction across the top surface.

In yet another aspect, a method of constructing a runway is provided. The method includes positioning a plurality of modular roadway structures on a surface. The plurality of modular roadway structures include a bottom surface configured to be positioned on the surface and a top surface formed with a predetermined textured pattern for defining a predetermined coefficient of friction across the top surface. The method further includes orienting the plurality of modular roadway structures in a predetermined orientation such that a directional friction force is provided along the runway.

DETAILED DESCRIPTION

The implementations described herein relate to a runway formed from a plurality of modular roadway structures having a tailorable surface texture. More specifically, rather than being formed from solid concrete slabs, the runway is formed from the plurality of modular roadway structures that are prefabricated and selectively installed based on a desired function and positioning of each structure on the runway. For example, the surface texture of each structure is selectively tailored to provide a predetermined coefficient of friction across a top surface of the structure. The predetermined coefficient of friction is selected such that the top surface provides a greater friction force than that of concrete, and provides better grip for aircraft traveling along the runway at certain regions thereof. Moreover, the structures are constructed such that underlying functional devices are capable of being installed and incorporated therewith. As such, the modular roadway structures are easily installable and transportable, easily replaceable, and selectively tailorable based on the needs and desired functions at predetermined regions of a runway or other suitable roadway surface.

As used herein, an element or step recited in the singular and proceeded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
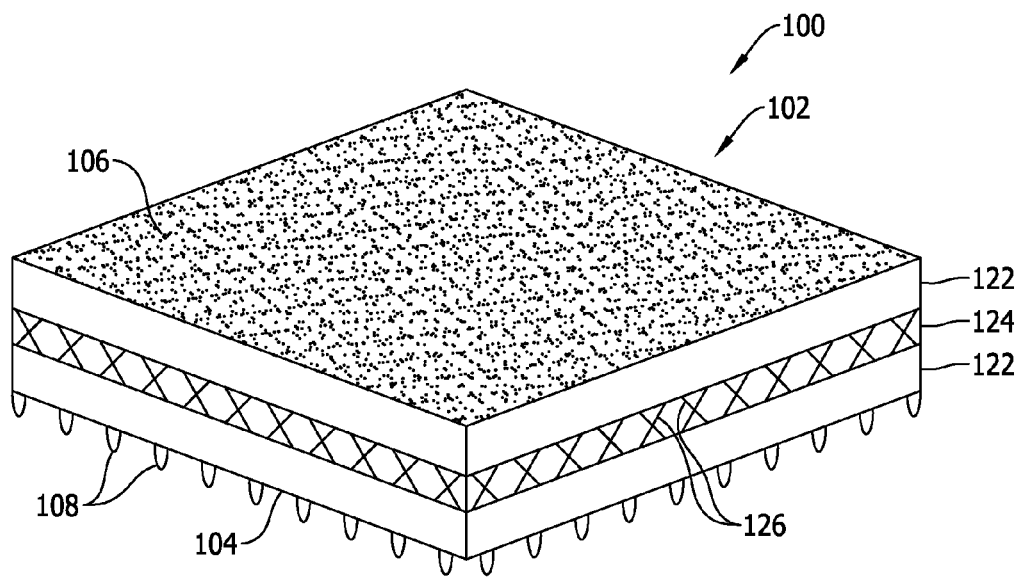
FIG. 1 is a perspective view illustration of an exemplary modular roadway structure.
Figure 2:
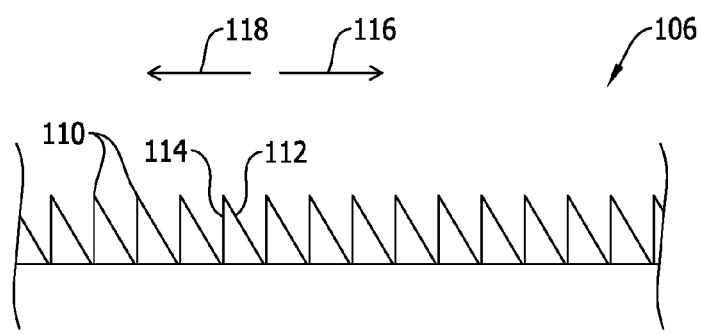
FIG. 2 is an enlarged side view illustration of an exemplary top surface of the modular roadway structures shown in FIG. 1.

FIG. 1 is a perspective view illustration of an exemplary modular roadway structure 100, and FIG. 2 is an enlarged side view illustration of a top surface of modular roadway structure 100. In the exemplary implementation, modular roadway structure 100 includes a body portion 102 including a bottom surface 104 and a top surface 106. Bottom surface 104 is for positioning on an existing surface (not shown), such as a dirt surface, a synthetic surface, or a paved surface. As will be explained in more detail below, the existing surface is at least partially excavated and modular roadway structure 100 is sized for installation within the excavated portion of the existing surface with a minimum clearance fit. Alternatively, body portion 102 includes a retaining mechanism (not shown) for mating with an adjacent modular roadway structure 100, such as a snap-on connection.

Moreover, in one implementation, bottom surface 104 includes an anchoring device (not shown) for securely coupling modular roadway structure 100 to the existing surface and restricting lateral movement of modular roadway structure 100 relative to the existing surface. An exemplary anchoring device includes, but is not limited to, one or more anchoring members 108 extending from bottom surface 104 for insertion within the existing surface.

Top surface 106 is formed with a predetermined textured pattern for defining a predetermined coefficient of friction across top surface 106. Top surface 106 is formed with any textured pattern that enables modular roadway structure 100 to function as described herein. For example, referring to FIG. 2, the predetermined textured pattern includes a plurality of projections 110 shaped to provide asymmetric directional friction forces across top surface 106. More specifically, projections 110 include a first side 112 and a second side 114, and are arranged to form a saw-tooth textured pattern. As such, first side 112 of projections 110 provides a first friction force 116 across top surface 106, and second side 114 of projections 110 provides a second friction force 118 greater than first friction force 116 across top surface 106. As will be explained in more detail below, the asymmetric directional friction forces provided by the predetermined textured pattern provide directional grip for vehicles traveling across top surface 106. As such, the predetermined textured pattern enables modular roadway structure 100 to be selectively oriented on a roadway based on desired directional grip at different regions of the roadway.

Moreover, in some implementations, the magnitude of the predetermined textured pattern is selectively adjustable such that different levels of friction are provided across top surface 106. As used herein, "magnitude" refers to degrees of variation in the size of projections 110, or the number of projections 110 per unit area across top surface 106. As such, the greater the magnitude of the predetermined textured pattern, the greater friction force and gripping power is provided across top surface 106. For example, the greater the size of projections 110, the greater friction force is provided. In addition, decreasing the number of projections 110 per unit area (i.e., spacing adjacent projections 110 from each other) facilitates increasing the friction force provided across top surface 106. In some implementations, the predetermined textured pattern is not uniform across top surface 106. For example, orienting a first group of projections 110 on top surface 106 in a first direction, and orienting a second group of projections 110 on top surface 106 in a second direction provides further functionality and directional grip to modular roadway structure 100.

In the exemplary implementation, includes and is formed from a bottom panel 120, a top panel 122, and a support structure 124 positioned between bottom panel 120 and top panel 122. Bottom surface 104 is defined on bottom panel 120, and top surface 106 is defined on top panel 122 such that projections 110 (shown in FIG. 2) are integrally formed with top panel 122. Bottom panel 120 and top panel 122 are also formed as a substantially solid structure. In contrast, support structure 124 defines an at least partially hollow space between bottom panel 120 and top panel 122. Defining the at least partially hollow space between bottom panel 120 and top panel 122 facilitates reducing material use when forming modular roadway structure 100, and enables conduits, pipes, electrical wiring, or other components to extend therethrough.

Support structure 124 has any configuration that enables modular roadway structure 100 to function as described herein. More specifically, support structure 124 includes a plurality of side walls 126 arranged such that the at least partially hollow space is defined between bottom panel 120 and top panel 122. Moreover, the thickness and configuration of side walls 126 are adjustable to tailor predetermined regions of modular roadway structure 100 to have higher strength, reinforcement, or compressibility. As such, additional flexibility and additional selectable attributes are provided when constructing modular roadway structure 100.

Moreover, in some implementations, top panel 122 is selectively removable from a remainder of modular roadway structure 100, such as support structure 124, and capable of replacement with a new or different top panel 122. More specifically, enabling top panel 122 to be selectively removable allows top panel 122 to be easily and rapidly replaceable when top panel 122 reaches the end of its service life due to wear or damage, for example. In addition, top panel 122 may be replaced with a top panel having different characteristics than the removed top panel, based on the desired functionality of modular roadway structure 100. For example, the replacement top panel may have a different magnitude of the predetermined textured pattern than the removed top panel (i.e., to accommodate greater wind conditions), or may be replaced with a top panel capable of deploying a functional device, as will be described in more detail below. In an alternative implementation, top panel 122 is removed from modular roadway structure 100 and reinstalled in a different orientation to modify the directional grip provided across modular roadway structure 100.

Body portion 102 may be fabricated from any material that enables modular roadway structure 100 to function as described herein. For example, in one implementation, the material used to fabricate body portion 102 is a three-dimensional (3D) printable material such that modular roadway structure 100 is capable of being additively manufactured. As such, modular roadway structure 100 is capable of being formed with a selectively tailored predetermined coefficient of friction, and additional selectable attributes based on the desired functionality of modular roadway structure 100. In the exemplary implementation, body portion 102 is not fabricated from and does not include concrete material. Moreover, in one implementation, body portion 102 is at least partially fabricated from recycled carbon fiber material.

Figure 3:
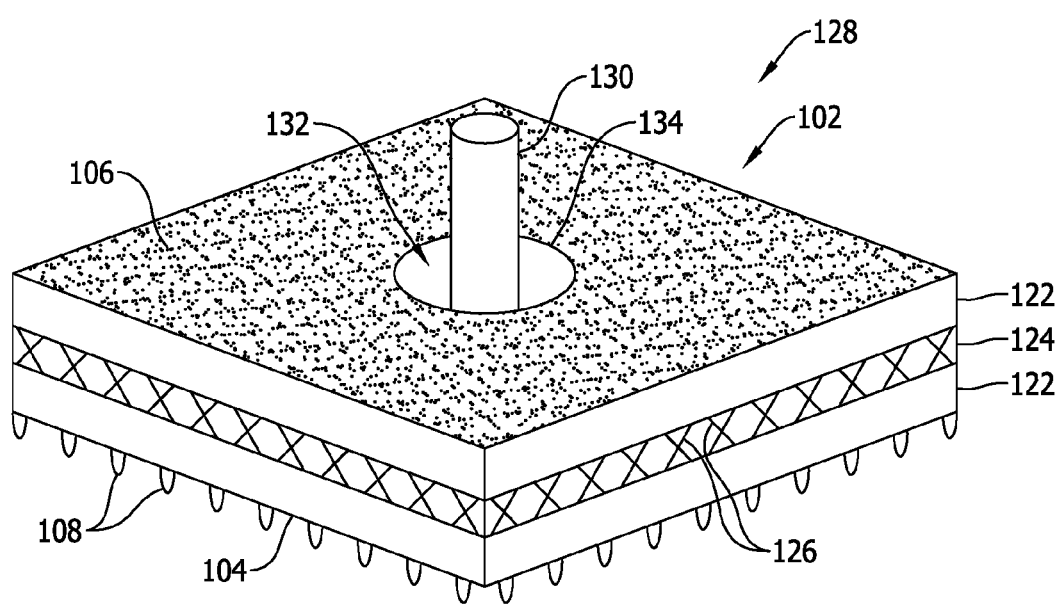
FIG. 3 is a perspective view illustration of an alternative modular roadway structure.

FIG. 3 is a perspective view illustration of an alternative modular roadway structure 128. In the exemplary implementation, modular roadway structure 128 includes at least one functional device 130 coupled to body portion 102. More specifically, body portion 102 includes a hollow channel 132 extending therethrough such that an opening 134 is defined at top surface 106. Hollow channel 132 is sized to receive functional device 130 such that functional device 130 is selectively retractable within body portion 102. Alternatively, functional device 130 is housed within body portion 102 when in operation. As such, when modular roadway structure 128 is used to form an aggregated roadway, functional device 130 is capable of being selectively activated from within body portion 102 to provide the desired function. Moreover, as described above, the hollow space defined between bottom panel 120 and top panel 122 enables functional device 130 to be easily connected to a central controller (not shown), for example.

Modular roadway structure 100 is also formed with a common electrical interface (i.e., plug and play interface) to provide a universal power and data pathway such that different functional devices are easily interchangeable with body portion 102. Exemplary functional devices include, but are not limited to, heating pads, sensors, data pathways, energy capture devices (i.e., solar panel modules), lighting mechanisms, foreign object debris detectors, robot storage modules, unmanned aerial vehicle launchers, safety proximity devices, wireless data transfer devices, acoustic disruptor devices for wildlife, airplane scanner devices, maintenance checkpoint devices, fog vacuum and/or blower devices, and weight sensing devices. Moreover, regarding the robot storage modules, functional device 130 facilitates storing and launching automated robots capable of performing any suitable function. For example, the automated robots are capable of performing functions such as, but not limited to aircraft maintenance and surface cleanup.

Figure 4:
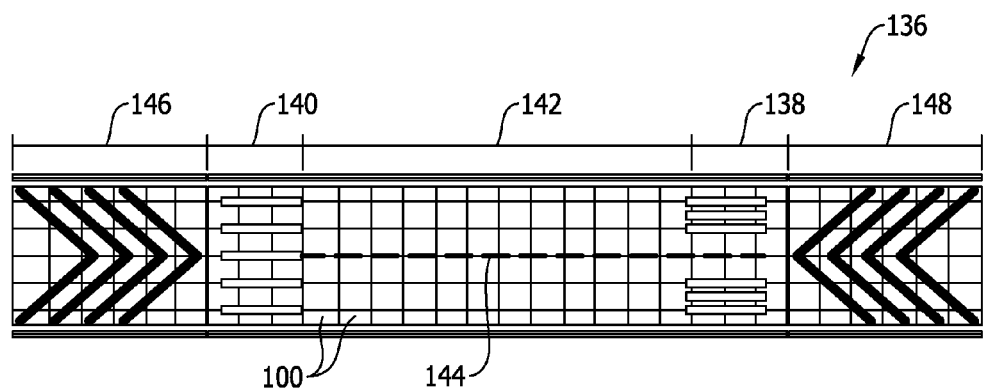
FIG. 4 is a top view of an exemplary runway.

FIG. 4 is a top view of an exemplary runway 136. In the exemplary implementation, runway 136 includes a touch-down zone 138, a takeoff zone 140, and a runway zone 142 extending between touch-down zone 138 and takeoff zone 140. At least one of touch-down zone 138, takeoff zone 140, or runway zone 142 include and are formed from a plurality of modular roadway structures 100. Modular roadway structures 128 (shown in FIG. 3) are also positionable to form runway 136 based on whether functional devices 130 (shown in FIG. 3) are needed at predetermined regions of runway 136. The plurality of modular roadway structures 100 have a predetermined textured pattern for defining a predetermined coefficient of friction across top surface 106 (shown in FIG. 1) and a top surface of runway 136, and are arranged to provide enhanced and predetermined directional grip across runway 136.

For example, in one implementation, the plurality of modular roadway structures 100 are oriented such that first friction force 116 and second friction force 118 (each shown in FIG. 2) are oriented with a length of runway 136. More specifically, the plurality of modular roadway structures 100 are oriented such that second friction force 118 is directionally oriented from takeoff zone 140 towards touch-down zone 138. As such, a vehicle traveling from takeoff zone 140 towards touch-down zone 138 is provided with enhanced directional grip to facilitate increasing acceleration, for example. Conversely, a vehicle traveling from touch-down zone 138 towards takeoff zone 140 is provided with oppositely oriented enhanced directional grip to facilitate increasing the braking power of the vehicle, for example.

In another implementation, the plurality of modular roadway structures 100 are oriented such that second friction force 118 is transversely oriented relative to the length of runway 136. More specifically, modular roadway structures 100 positioned on opposing sides of a centerline 144 of runway 136 are oriented such that second friction force 118 is directionally oriented towards centerline 144. As such, transverse movement is inhibited across runway 136. Inhibiting transverse movement across runway 136 facilitates ensuring a vehicle does not slide off runway 136, especially during a crosswind landing, for example. In an alternative implementation, the plurality of modular roadway structures 100 include a combination of projections 110 directionally oriented differently from each other such that directional grip is enhanced in more than one direction across runway 136.

In the exemplary implementation, runway 136 also includes a first overrun zone 146 and a second overrun zone 148. First overrun zone 146 is positioned adjacent to takeoff zone 140, and second overrun zone 148 is positioned adjacent to touch-down zone 138. First overrun zone 146 includes a plurality of modular roadway structures 100 oriented such that second friction force 118 is directionally oriented from first overrun zone 146 towards touch-down zone 138. As such, first overrun zone 146 provides enhanced directional grip to a vehicle traveling from touch-down zone 138 towards takeoff zone 140. Moreover, in one implementation, the predetermined textured pattern in first overrun zone 146 has a greater magnitude than the predetermined textured pattern in touch-down zone 138, takeoff zone 140, and runway zone 142 to ensure the vehicle is restricted from traveling past runway 136 and into an unsurfaced area. Similarly, second overrun zone 148 includes a plurality of modular roadway structures 100 oriented such that second friction force 118 is directionally oriented from second overrun zone 148 towards takeoff zone 140. As such, second overrun zone 148 provides enhanced directional grip to a vehicle traveling from takeoff zone 140 towards touch-down zone 138, and ensures the vehicle is restricted from traveling past runway 136 and into an unsurfaced area.

Moreover, in some implementations, the predetermined textured pattern in touch-down zone 138 and takeoff zone 140 has a greater magnitude than the predetermined textured pattern in runway zone 142. Providing enhanced directional grip in touch-down zone 138 and takeoff zone 140 aids a vehicle in decelerating and accelerating in a more efficient manner. Alternatively, runway zone 142 is not formed from modular roadway structures 100.

Figure 5:
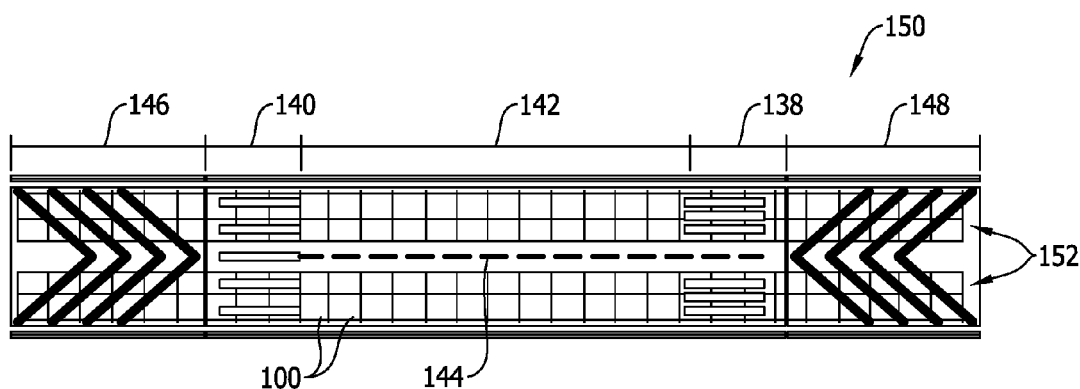
FIG. 5 is a top view of an alternative runway.

FIG. 5 is a top view of an alternative runway 150. In the exemplary implementation, the plurality of modular roadway structures 100 are arranged in a pair of laterally-spaced roadway sections 152 extending along the length of runway 150. As such, the most heavily traveled portions of runway 150 are provided with enhanced directional grip without having to install more modular roadway structures 100 than that is necessary.

A method of constructing runway 136 is also described herein. The method includes positioning a plurality of modular roadway structures 100 on a surface. The plurality of modular roadway structures 100 include bottom surface 104 configured to be positioned on the surface and top surface 106 formed with a predetermined textured pattern for defining a predetermined coefficient of friction across top surface 106. The method also includes orienting the plurality of modular roadway structures 100 in a predetermined orientation such that a directional friction force is provided along runway 136.

In one implementation, each modular roadway structure 100 includes a bottom panel and a top panel, and the method further includes replacing the top panel of at least one modular roadway structure of the plurality of modular roadway structures with a replacement top panel. Moreover, the method further includes replacing an installed modular roadway structure 100 of the plurality of modular roadway structures 100 with a replacement modular roadway structure 100. The replacement modular roadway structure 100 is either the same modular roadway structure as the installed modular roadway structure 100, or is different from the installed modular roadway structure 100. As such, modular roadway structures 100 are interchangeable such that attributes of runway 136 are selectively and easily modifiable.

Positioning a plurality of modular roadway structures 100 also includes positioning at least one modular roadway structure 100 having plug and play functionality on the existing surface, wherein the at least one modular roadway structure 100 is configured to interchangeable connect with a plurality of functional devices.

Moreover, in some implementations, the method further includes anchoring the plurality of modular roadway structure 100 to the surface, or mating adjacent modular roadway structures 100 with each other.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A modular roadway structure comprising:
a body portion comprising a bottom surface and a top surface,
wherein said bottom surface is configured to be positioned on a surface, and wherein said top surface is formed with a predetermined textured pattern configured to provide directional friction forces, that are oppositely oriented and of asymmetric friction levels, across said top surface from end-to-end of said body portion.

2. The modular roadway structure in accordance with claim 1, wherein said body portion is fabricated from carbon fiber material.

3. The modular roadway structure in accordance with claim 1, wherein the predetermined textured pattern comprises a plurality of projections comprising a first side and a second side, said first side providing a first friction force across said top surface, and said second side providing a second friction force, the second friction force greater than the first friction force and oriented in an opposing direction relative to the first friction force, across said top surface.

4. The modular roadway structure in accordance with claim 3, wherein said plurality of projections form a sawtooth textured pattern.

5. The modular roadway structure in accordance with claim 1 further comprising at least one functional device coupled to said body portion.

6. The modular roadway structure in accordance with claim 5, wherein said body portion comprises a hollow channel extending therethrough such that an opening is defined at said top surface, said hollow channel sized to receive said at least one functional device such that said at least one functional device is selectively retractable within said body portion.

7. The modular roadway structure in accordance with claim 1, wherein said body portion comprises:
a bottom panel;
a top panel; and
a support structure positioned between said bottom panel and said top panel, wherein said support structure defines an at least partially hollow space between said bottom panel and said top panel.

8. The modular roadway structure in accordance with claim 7, wherein said top panel is selectively removable from said support structure.

9. A runway comprising:
a touch-down zone;
a takeoff zone; and
a runway zone extending between said touch-down zone and said takeoff zone, wherein at least one of said touch-down zone, said takeoff zone, or said runway zone comprise a plurality of modular roadway structures that each comprise a top surface formed with a predetermined textured pattern forming directional friction forces, that are oppositely oriented and of asymmetric friction levels, across the predetermined textured pattern of said top surface.

10. The runway in accordance with claim 9, wherein the predetermined textured pattern comprises a plurality of projections comprising a first side and a second side, said first side providing a first friction force across said top surface, and said second side providing a second friction force greater than the first friction force across said top surface.

11. The runway in accordance with claim 10, wherein said plurality of modular roadway structures comprises said plurality of projections, said plurality of modular roadway structures oriented such that the first friction force and the second friction force are oriented with a length of the runway.

12. The runway in accordance with claim 11, wherein said plurality of modular roadway structures are oriented such that the second friction force is directionally oriented from said takeoff zone towards said touch-down zone.

13. The runway in accordance with claim 10, wherein said plurality of modular roadway structures comprises said plurality of projections, said plurality of modular roadway structures oriented such that the second friction force is transversely oriented relative to a length of the runway.

14. The runway in accordance with claim 9 further comprising an overrun zone positioned adjacent to said takeoff zone, wherein the predetermined textured pattern in said overrun zone has a greater magnitude than the predetermined textured pattern in said touch-down zone, said takeoff zone, and said runway zone.

15. The runway in accordance with claim 9, wherein the predetermined textured pattern in said touch-down zone and said takeoff zone is greater than the predetermined textured pattern in said runway zone.

16. The runway in accordance with claim 9, wherein said plurality of modular roadway structures are arranged in a pair of laterally-spaced roadway sections extending along a length of the runway.

17. A method of constructing a runway, said method comprising:
positioning a plurality of modular roadway structures on a surface, wherein the plurality of modular roadway structures include a bottom surface configured to be positioned on the surface and a top surface formed with a predetermined textured pattern configured to provide directional friction forces, that are oppositely oriented and of asymmetric friction levels, across the top surface from end-to-end of each modular roadway structure; and
orienting the plurality of modular roadway structures in a predetermined orientation such that the directional friction forces are provided lengthwise along the runway.

18. The method in accordance with claim 17, wherein each modular roadway structure includes a bottom panel and a top panel, said method further comprising replacing the top panel of at least one modular roadway structure of the plurality of modular roadway structures with a replacement top panel.

19. The method in accordance with claim 17 further comprising replacing an installed modular roadway structure of the plurality of modular roadway structures with a replacement modular roadway structure.

20. The method in accordance with claim 17, wherein positioning a plurality of modular roadway structures comprises positioning at least one modular roadway structure having plug and play functionality on the surface, wherein the at least one modular roadway structure is configured to interchangeably connect with a plurality of functional devices.

* * * * *